(12) United States Patent
Peng et al.

(10) Patent No.: US 7,697,276 B2
(45) Date of Patent: Apr. 13, 2010

(54) FIXING APPARATUS FOR HARD DISK DRIVE

(75) Inventors: Wen-Tang Peng, Taipei Hsien (TW); Guang-Yi Zhang, Shenzhen (CN); Zhe Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 97 days.

(21) Appl. No.: 11/963,865

(22) Filed: Dec. 24, 2007

(65) Prior Publication Data
US 2009/0095873 A1  Apr. 16, 2009

(30) Foreign Application Priority Data
Oct. 11, 2007  (CN) .................... 2007 1 0202017

(51) Int. Cl.
*G06F 1/16* (2006.01)
(52) U.S. Cl. .............................. 361/679.33; 360/264.2; 312/223.2; 248/694
(58) Field of Classification Search ................. 248/618, 248/633; 364/708.1; 439/638; 361/679.3, 361/679.26, 679.27, 679.35
See application file for complete search history.

(56) References Cited

U.S. PATENT DOCUMENTS

| 5,654,873 A * | 8/1997 | Smithson et al. ........ 361/679.37 |
| 2007/0211422 A1 * | 9/2007 | Liu et al. .................... 361/685 |
| 2009/0073649 A1 * | 3/2009 | Ikeda et al. ............ 361/679.35 |

* cited by examiner

*Primary Examiner*—Hung V Duong
(74) *Attorney, Agent, or Firm*—Frank R. Niranjan

(57) ABSTRACT

An exemplary fixing apparatus is for mounting a hard disk drive (HDD) having a plurality of holes defined in sidewalls and includes a bracket, a clip, and a plurality of fixing pins. The bracket includes an end plate, and a pair of side plates extending from opposite ends of the end plate respectively. The side plates are capable of being flexed away from each other for allowing the HDD to be placed therebetween. The clip is pivotably attached to one side plate and detachably locked with the other side plate. The fixing pins are attached to the side plates to engage in the holes of the HDD.

20 Claims, 3 Drawing Sheets

Figure 1:
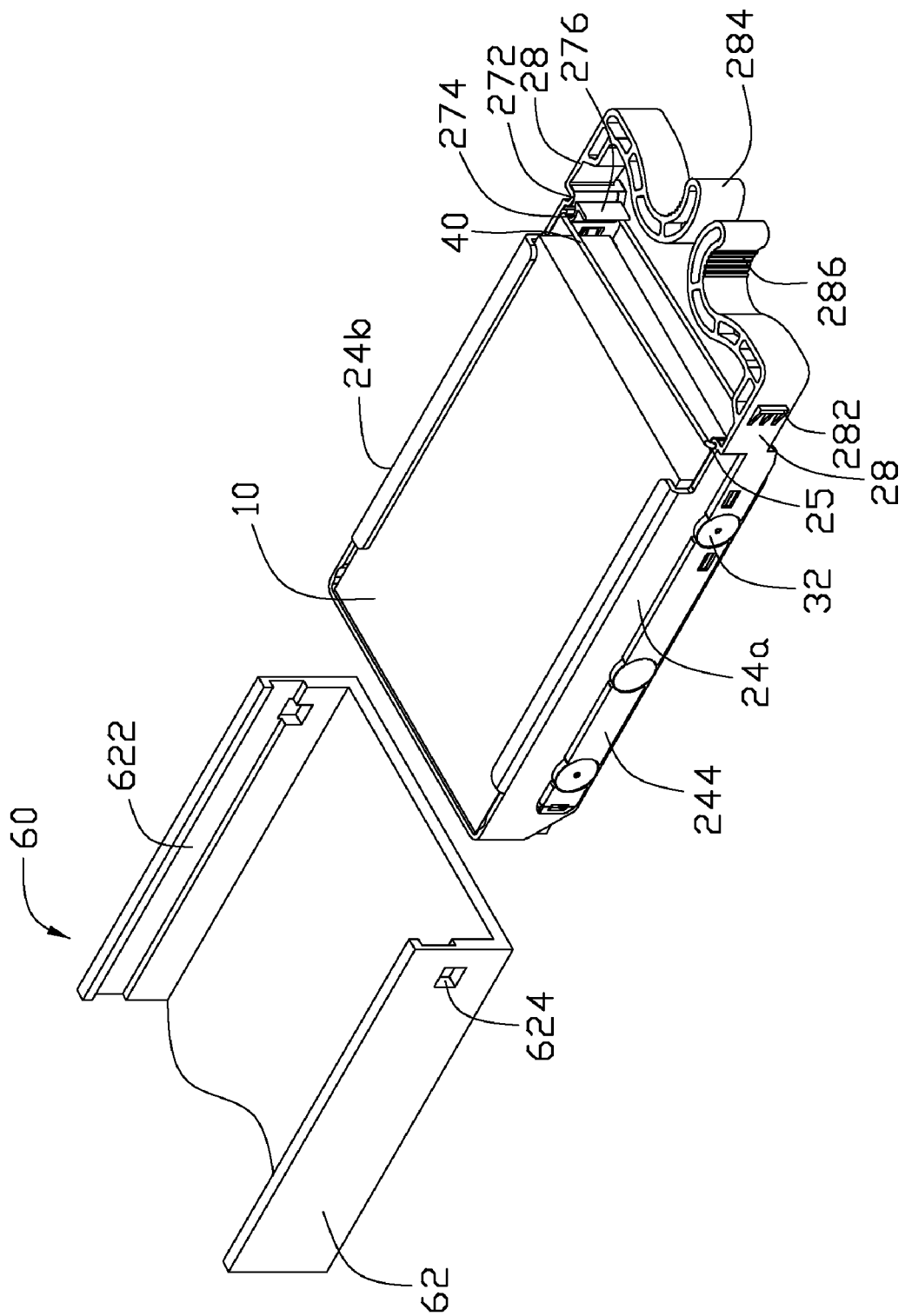
Figure 2:
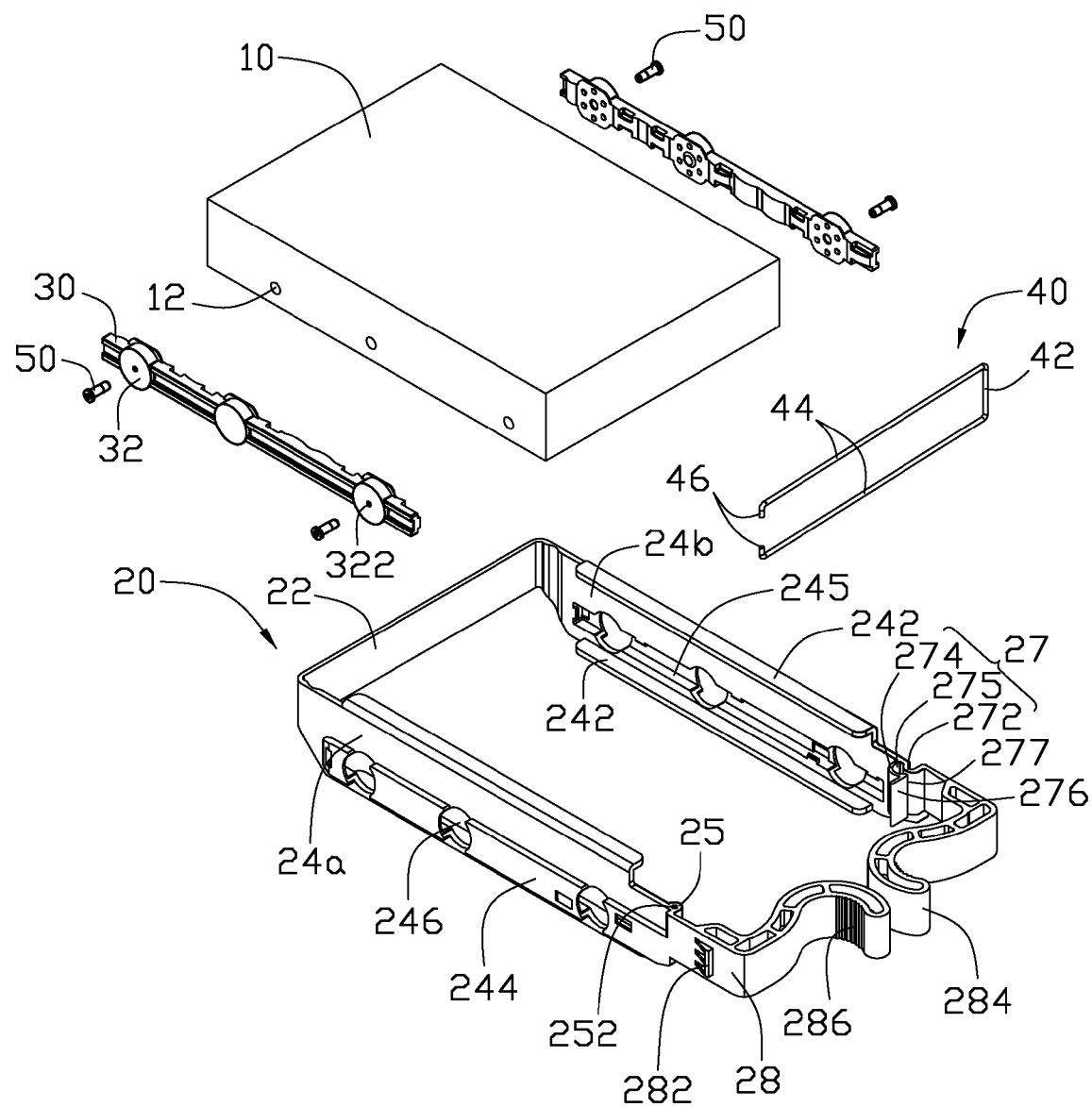
Figure 3:
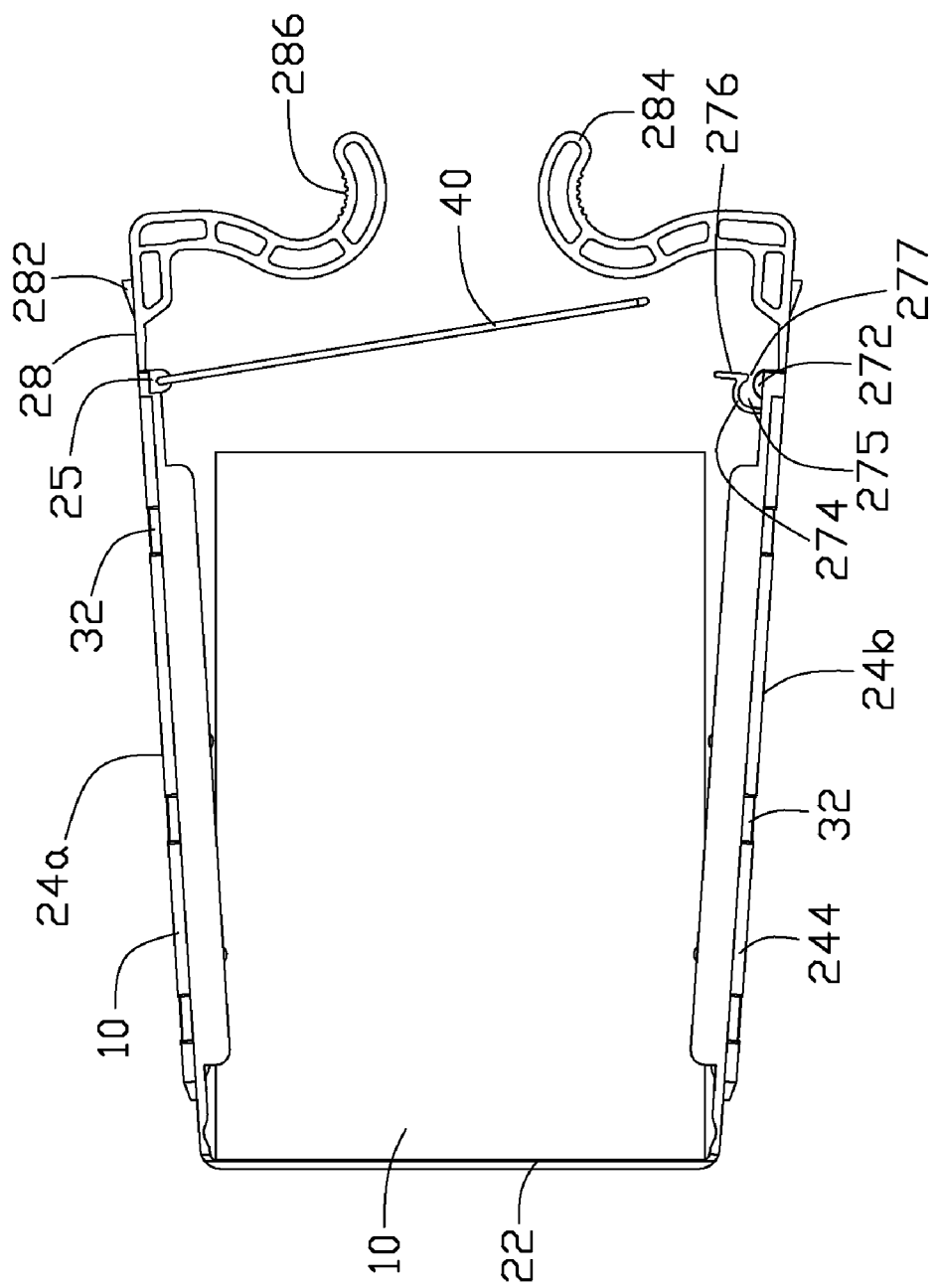

FIXING APPARATUS FOR HARD DISK DRIVE

CROSS-REFERENCES TO RELATED APPLICATION

Relevant subject matter is disclosed in the 6 co-pending U.S. patent applications (application Ser. Nos. 11/963,871, 11/963,8769, 11/963,868, 11/963,864, 11/963,867, 11/963, 870); filed on the same date and having a same title as the present application, which are assigned to the same assignee as this patent application. Relevant subject matter is also disclosed in the co-pending U.S. patent application Ser. No. 11/953,863, filed on Dec. 11, 2007, having a same title as the present application, which is assigned to the same assignee as this patent application.

BACKGROUND

1. Field of the Invention

The present invention relates to fixing apparatuses, and particularly to a fixing apparatus for hard disk drives (HDDs).

2. Description of Related Art

The conventional approach now being adopted to mount an HDD in a computer chassis generally involves placing the HDD in a holding area of a drive bracket; screwing a plurality of screws through side walls of the drive bracket into two sides of the HDD to fasten the HDD on the drive bracket; and mounting the HDD and the bracket in a computer chassis or a mobile HDD rack. For proper balanced installation of the HDD, multiple screws should be fastened at the same time, making installation and removal of the HDD tedious.

What is desired, therefore, is a fixing apparatus which allows convenient installation and removal of an HDD.

SUMMARY

An exemplary fixing apparatus is for mounting a hard disk drive (HDD) having a plurality of holes defined in sidewalls and includes a bracket, a clip, and a plurality of fixing pins. The bracket includes an end plate, and a pair of side plates extending from opposite ends of the end plate respectively. The side plates are capable of being flexed away from each other for allowing the HDD to be placed therebetween. The clip is pivotably attached to one side plate and detachably locked with the other side plate. The fixing pins are attached to the side plates to engage in the holes of the HDD.

Other advantages and novel features will become more apparent from the following detailed description when taken in conjunction with the accompanying drawings, in which:

BRIEF DESCRIPTION OF THE DRAWINGS

FIG. 1 is an isometric view of a fixing apparatus of an embodiment of the present invention assembled with an HDD, and a rack;

FIG. 2 is an exploded, isometric view of the fixing apparatus of FIG. 1; and FIG. 3 is a top plan view of the fixing apparatus of FIG. 1 in a releasing position.

DETAILED DESCRIPTION OF THE EMBODIMENT

Referring to FIGS. 1 and 2, a fixing apparatus in accordance with an embodiment of the present invention is for fixing a hard disk drive (HDD) 10 in a rack 60. The fixing apparatus includes a bracket 20, a pair of shock absorbing members 30, a clip 40, and a plurality of fixing pins 50.

The rack 60 includes a pair of parallel sidewalls 62 defining a receiving space therebetween. A pair of railways 622 is defined at the insides of the sidewalls 62, respectively. A pair of locking holes 624 is defined in the sidewalls 62 beside the railways 622, respectively.

The HDD 10 includes a pair of holes 12 defined in each of two opposite sidewalls thereof.

The bracket 20 has an integral U-shaped configuration and includes an end plate 22, and a pair of side plates 24*a*, 24*b* extending perpendicularly from opposite ends of the end plate 22 respectively in a same direction. A pivoting portion 25 extends inward from an inside wall of the side plate 24*a* at a distal end thereof. A pivoting hole 252 is defined in the pivoting portion 25. A retaining portion 27 is formed at an inside wall of side plate 24*b* at a distal end thereof, corresponding to the pivoting portion 25 of the side plate 24*a*. The retaining portion 27 includes a half-cylindrical protrusion 272 extending inward from the inside wall of the side plate 24*b*, and a C-shaped resilient tab 274 extending from one vertical side of the protrusion 272 and toward the other vertical side of the protrusion 272. The protrusion 272 and the retaining tab 274 cooperatively define a retaining space 275 and an entry 277 therebetween. An operating tab 276 extends from an outside edge of the resilient tab 274. The side plates 24*a*, 24*b* include a pair of extension portions 28 extending forward from the front ends of the side plates 24*a*, 24*b*, respectively. A pair of wedged blocks 282 extends outward from outside walls of the extension portions 28, respectively. Two J-shaped operating arms 284 extend toward each other from distal ends of the extension portions 28 respectively. A toothed urging portion 286 is formed at the inside of the arced free end of each of the operating arms 284. Each of the side plates 24*a*, 24*b* includes a pair of flanges 242 extending perpendicularly from an upper edge and a lower edge thereof, respectively. Each of the side plates 24*a*, 24*b* includes a long platform 244 extending from an outside wall thereof, and a recessed portion 245 correspondingly defined in an inside wall thereof. A plurality of mounting holes 246 is defined in the platforms 244, extending to the side plates 24*a*, 24*b*.

The clip 40 is made of a resilient, high strength metal wire and includes a locking section 42, a pair of transverse sections 44 extending perpendicularly from opposite ends of the locking section 42 respectively, and a pair of pivoting sections 46 extending toward each other and perpendicularly from distal ends of the transverse sections 44, respectively.

Each of the shock absorbing members 30 is an elongated bar and made of conductive rubber. A plurality of cylindrical mounting portions 32 is formed in each of the shock absorbing members 30. A central through hole 322 is defined in each of the mounting portions 32.

The fixing pins 50 are made of metal, and are inserted into the central through holes 322 of the shock absorbing members 30. The shock absorbing members 30 are retained in the recessed portions 245 of the side plates 24*a*, 24*b*, with the mounting portions 32 extending through the mounting holes 246 of the side plates 24*a*, 24*b*.

In assembly, the clip 40 is pivotably attached to the side plate 24*a* of the bracket 20, with the pivoting sections 46 of the clip 40 engaging in the pivoting hole 252 of the pivoting portion 25 of the side plate 24*a*. The locking section 42 of the clip 40 is detachably retained in the retaining space 275 of the retaining portion 27 of the side plate 24*b* via the entry 277.

To retain the HDD 10 in the bracket 20, the operating tab 276 of the retaining portion 27 of the side plate 24*b* is flexed open to enlarge the entry 277 so that the locking section 42 of the clip 40 can be pivotably moved away from the retaining portion 27. Then, the side plates 24a, 24b are urged open, for allowing the HDD 10 to be placed therebetween, with the holes 12 of the HDD 10 in alignment with the fixing pins 50 of the side plates 24a, 24b. Then the side plates 24a, 24b are released so that the fixing pins 50 thereof extend into the holes 12 of the HDD 10. The locking section 42 of the clip 20 is pivotably moved into the retaining space 275 of the retaining portion 27 via the entry 277. Thus, the HDD 10 is secured in the bracket 20.

To release the HDD 10 from the bracket 20, the locking section 42 of the clip 40 is disengaged from the retaining space 275 of the bracket 20 as described above, so that the side plates 24a, 24b of the bracket 20 can be urged open. Thus, the HDD 10 can then be easily removed.

The bracket 20 together with the HDD 10 is inserted into the rack 60, with the platforms 244 of the bracket 20 sliding in the railways 622 of sidewalls 62 of the rack 60. When the wedged blocks 282 of the bracket 20 engage in the locking holes 624 of the sidewalls 62 of the rack 60, the bracket 20 is secured in the rack 60. To release the bracket 20 from the rack 60, the operating arms 284 are drawn toward at the toothed urging portions 286 thereof to disengage the wedged blocks 282 from the locking holes 624 of the rack 60. Then, the bracket 20 is slid out of the rack 60.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A fixing apparatus for fixing a hard disk drive (HDD) with a plurality of holes defined in sidewalls thereof, the fixing apparatus comprising:
    a bracket comprising an end plate, and a pair of side plates extending from two ends of the end plates, the side plates capable of being flexed away from each for allowing the HDD to be placed therebetween;
    a clip pivotably attached to a free end of one of the side plates opposite to the end plate, and detachably locked with a free end of the other one of the side plates opposite to the end plate; and
    a plurality of fixing pins attached to the side plates to engage in the holes of HDD.

2. The fixing apparatus as claimed in claim 1, wherein one plate comprises a retaining portion formed at the free end thereof, the clip comprises a locking section detachably engaging in the retaining portion.

3. The fixing apparatus as claimed in claim 2, wherein the retaining portion comprises a protrusion extending inward from the corresponding side plate, an arced resilient tab extending from one side of the protrusion and toward the other side of the protrusion, a retaining space is defined between the resilient tab and the protrusion to retain the locking section.

4. The fixing apparatus as claimed in claim 2, wherein the clip further comprises a pair of transverse sections extending perpendicularly from opposite ends thereof, and a pair of pivoting sections extending toward each other from two distal ends of the transverse sections respectively, the other side plate comprises a pivoting portion extending inward from an inside wall thereof, a pivoting hole is defined in the pivoting portion to receive the pivoting sections therein.

5. The fixing apparatus as claimed in claim 1, wherein each of the side plates comprises a pair of flanges extending from two opposite edges thereof to sandwich the HDD therebetween.

6. The fixing apparatus as claimed in claim 1, further comprising a pair of shock absorbing bars, wherein each of the side plates comprises a platform extending from an outside thereof, and a recessed portion correspondingly defined in an inside thereof, for receiving the shock absorbing bar therein.

7. The fixing apparatus as claimed in claim 6, wherein each of the shock absorbing bars comprises a plurality of mounting portions formed therein, each of the platforms comprises a plurality of mounting holes defined therein and extending to the corresponding side plate to receive the mounting portions of the shock absorbing bar.

8. The fixing apparatus as claimed in claim 6, wherein a plurality of fixing holes is defined in the shock absorbing bars to receive the fixing pins therein.

9. The fixing apparatus as claimed in claim 6, wherein the shock absorbing bars are made of conductive rubber.

10. The fixing apparatus as claimed in claim 1, wherein a pair of extension portions respectively extends forward from the free ends of the side plates respectively, a pair of wedged blocks extends from outside walls of the extension portions, respectively.

11. The fixing apparatus as claimed in claim 10, wherein two operating arms extend toward each other from distal ends of the extension portions respectively.

12. An assembly comprising:
    an integrally-formed, U-shaped bracket defining an opening in an end;
    a hard disk drive (HDD) received in the bracket and defining a plurality of holes in opposite sidewalls of the HDD; and
    a clip forming a first end pivotably attached to the bracket adjacent to the opening of the bracket, and a second end detachably locked with the bracket to close the opening of the bracket, thereby preventing the HDD from disengaging from the bracket.

13. The assembly as claimed in claim 12, wherein the bracket comprises an end plate, and a pair of side plates extending from opposite ends of the end plates, the opening of the bracket is defined between free ends of the pair of the side plates.

14. The assembly as claimed in claim 13, wherein a pivoting portion and a retaining portion are respectively formed at the two side plates, the clip forms a pair of pivoting sections pivotably engaging in the pivoting portion, and a locking section detachably engaging in the retaining portion.

15. The assembly as claimed in claim 14, wherein the retaining portion of the bracket comprises a protrusion extending inward from the corresponding side plate, an arced resilient tab extending from one side of the protrusion and toward the other side of the protrusion, a retaining space is defined between the resilient tab and the protrusion to receiving the locking section of the clip.

16. The assembly as claimed in claim 13, further comprising a pair of conductive shock absorbing bars attached the side plate, respectively, and abutting against the sidewalls of the HDD.

17. The assembly as claimed in claim 16, wherein each of the shock absorbing bars comprises a plurality of mounting portions formed therein, each of the platforms comprises a plurality of mounting holes defined therein and extending to the corresponding side plate to receive the mounting portions of the shock absorbing bar.

18. The assembly as claimed in claim 16, further comprising a plurality of fixing pins extending from the shock absorbing bars and engaging in the holes of HDD.

19. The assembly as claimed in claim 18, wherein two operating arms extend toward each other from distal ends of the extension portions respectively.

20. The assembly as claimed in claim 13, wherein a pair of extension portions respectively extends forward from the free ends of the side plates respectively, a pair of wedged blocks extends from outside walls of the extension portions, respectively.

* * * * *